United States Patent
Kheraluwala et al.

(10) Patent No.: US 10,855,214 B2
(45) Date of Patent: Dec. 1, 2020

(54) ELECTRICAL POWERTRAIN FOR AIRCRAFT

(71) Applicant: Hamilton Sundstrand Corporation, Charlotte, NC (US)

(72) Inventors: Mustansir Kheraluwala, Lake Zurich, IL (US); Xin Wu, Glastonbury, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/379,382

(22) Filed: Apr. 9, 2019

(65) Prior Publication Data
US 2020/0328706 A1 Oct. 15, 2020

(51) Int. Cl.
*H02P 9/00* (2006.01)
*H02P 9/08* (2006.01)
*H02J 7/14* (2006.01)
*B64D 27/24* (2006.01)
*F02C 7/268* (2006.01)
(Continued)

(52) U.S. Cl.
CPC .............. *H02P 9/008* (2013.01); *B64D 27/24* (2013.01); *B64D 35/02* (2013.01); *F02C 7/268* (2013.01); *H02J 7/1415* (2013.01); *H02P 9/08* (2013.01); *B64D 2221/00* (2013.01); *H02P 2101/25* (2015.01); *H02P 2101/30* (2015.01)

(58) Field of Classification Search
CPC .. H02P 9/008; H02P 2101/25; H02P 2101/30; H02J 7/1415; B64D 27/24
USPC ..................................................... 290/31, 52
See application file for complete search history.

(56) References Cited

U.S. PATENT DOCUMENTS 4,772,802 A * 9/1988 Glennon ................. F02N 11/04
290/31
4,868,406 A * 9/1989 Glennon ................. F02N 11/04
290/4 R
(Continued)

FOREIGN PATENT DOCUMENTS

EP 1810861 A1 7/2007
EP 2128427 A1 12/2009

OTHER PUBLICATIONS

European Search Report for European Application No. 19210926.2; Application Filing Date Nov. 22, 2019; dated Jun. 17, 2020 (7 pages).

*Primary Examiner* — Julio C. Gonzalez
(74) *Attorney, Agent, or Firm* — Cantor Colburn LLP

(57) ABSTRACT

Disclosed is an energy management system for an aircraft. The system includes an electric machine including a stator surrounding a rotor having permanent magnets disposed therein, wherein rotation of the rotor causes an alternating current to be generated in windings of the stator that is uncontrolled. The system includes an electric propulsion system. The system includes a bidirectional power converter having a first side connected to the electric machine and a second side galvanically isolated from the first side and connected to the electric propulsion system. The bidirectional power converter includes a switching network that regulates power associated with the electric machine and power transfer across the bidirectional power converter. The switching network is operable to satisfy collective power flows of the electric machine and the electric propulsion system through the bidirectional power converter.

19 Claims, 3 Drawing Sheets

(51) Int. Cl.
  *B64D 35/02* (2006.01)
  *H02P 101/30* (2015.01)
  *H02P 101/25* (2016.01)

(56) References Cited

U.S. PATENT DOCUMENTS

| | | | | |
|---|---|---|---|---|
| 4,967,096 A * | 10/1990 | Diemer | ............... | F02N 11/04 290/38 R |
| 5,023,537 A * | 6/1991 | Baits | ............... | F02N 11/04 290/4 R |
| 5,512,811 A * | 4/1996 | Latos | ............... | F02N 11/04 322/10 |
| 5,899,411 A * | 5/1999 | Latos | ............... | B64D 33/00 244/53 A |
| 6,018,233 A * | 1/2000 | Glennon | ............... | F02N 11/04 322/22 |
| 6,037,752 A * | 3/2000 | Glennon | ............... | H05K 7/1432 322/22 |
| 7,285,871 B2 * | 10/2007 | Derouineau | ............... | F02C 9/26 290/52 |
| 7,692,331 B2 * | 4/2010 | Langlois | ............... | H02J 7/34 307/59 |
| 8,154,148 B2 * | 4/2012 | Langlois | ............... | B64D 41/00 307/9.1 |
| 8,237,416 B2 * | 8/2012 | Rozman | ............... | H02J 1/12 322/22 |
| 8,401,770 B2 | 3/2013 | Rouis | | |
| 9,344,029 B2 * | 5/2016 | Kleinodt | ............... | H02M 5/458 |
| 9,586,690 B2 * | 3/2017 | Rajashekara | ............... | B64C 11/305 |
| 9,745,943 B2 * | 8/2017 | Vieillard | ............... | F02N 11/04 |
| 9,964,044 B2 * | 5/2018 | Juarez Becerril | ............... | B64D 41/00 |
| 10,094,293 B2 * | 10/2018 | Perkinson | ............... | F02C 3/10 |
| 10,131,441 B2 * | 11/2018 | Edwards | ............... | B64D 27/02 |
| 2004/0108726 A1 | 6/2004 | Sarlioglu et al. | | |
| 2014/0355311 A1 * | 12/2014 | Biebach | ............... | H02M 3/33584 363/17 |
| 2015/0130384 A1 * | 5/2015 | Mahdavi | ............... | B60L 9/00 318/442 |
| 2016/0028321 A1 * | 1/2016 | White | ............... | H02M 5/458 363/37 |
| 2016/0376918 A1 * | 12/2016 | Swann | ............... | F01D 21/003 60/772 |
| 2017/0291712 A1 * | 10/2017 | Himmelmann | ............... | F02C 6/00 |
| 2018/0034395 A1 * | 2/2018 | Huang | ............... | H02P 9/302 |
| 2018/0138819 A1 | 5/2018 | Schekulin | | |
| 2018/0265206 A1 * | 9/2018 | Himmelmann | ............... | B64D 27/24 |
| 2018/0309397 A1 * | 10/2018 | De Wergifosse | ............... | H02P 1/26 |

\* cited by examiner

ELECTRICAL POWERTRAIN FOR AIRCRAFT

BACKGROUND

Exemplary embodiments pertain to the art of aircraft electrical propulsion systems. Turbines may be used to drive electric generation on wound field synchronous machines. Excitation circuits are used to adjust generator power output by adjusting magnetic fields in the electric machine. Excitation circuits and wound field synchronous machines require active control and add unnecessary weight to the aircraft.

BRIEF DESCRIPTION

Disclosed is an energy management system for an aircraft. The system includes an electric machine including a stator surrounding a rotor having permanent magnets disposed therein, wherein rotation of the rotor causes an alternating current to be generated in windings of the stator that is uncontrolled. The system includes an electric propulsion system. The system includes a bidirectional power converter having a first side connected to the electric machine and a second side galvanically isolated from the first side and connected to the electric propulsion system. The bidirectional power converter includes a switching network that regulates power associated with the electric machine and power transfer across the bidirectional power converter. The switching network is operable to satisfy collective power flows of the electric machine and the electric propulsion system through the bidirectional power converter.

In addition to one or more of the features described above, or as an alternative, further embodiments may include a controller operable to operate the switching network to regulate power associated with the electric machine and power transfer across the bidirectional power converter.

In addition to one or more of the features described above, or as an alternative, further embodiments may include a battery connected to the bidirectional power converter through a third side of the bidirectional power converter.

In addition to one or more of the features described above, or as an alternative, further embodiments may include that the first side and the third side are same.

In addition to one or more of the features described above, or as an alternative, further embodiments may include that the switching network is further operable to regulate power transfer across the bidirectional power converter operable to satisfy collective power flows from the electric machine, the battery and the electric propulsion system through the bidirectional power converter.

In addition to one or more of the features described above, or as an alternative, further embodiments may include that the switching network includes H-bridges operable to transfer alternating current across the bidirectional power converter.

In addition to one or more of the features described above, or as an alternative, further embodiments may include a controller operable to drive gates of switches of a first of the H-bridges that produces an offset phase from a phase of a second of the H-bridges.

In addition to one or more of the features described above, or as an alternative, further embodiments may include a rectifier disposed to conduct current between the electric machine and the bidirectional power converter.

In addition to one or more of the features described above, or as an alternative, further embodiments may include that the rectifier is an active rectifier having switches operable to rectify alternating current from the electric machine and alternate direct current from the bidirectional power converter operable to turn the electric machine.

In addition to one or more of the features described above, or as an alternative, further embodiments may include that the electric machine is operable to start a turbine.

In addition to one or more of the features described above, or as an alternative, further embodiments may include that the active rectifier includes a rectifier half bridge.

In addition to one or more of the features described above, or as an alternative, further embodiments may include that the electric propulsion system includes an inverter, a propulsion electric machine, and a propulsor.

In addition to one or more of the features described above, or as an alternative, further embodiments may include that the electric propulsion system is operable to draw energy from the bidirectional power converter to propel the aircraft.

In addition to one or more of the features described above, or as an alternative, further embodiments may include that the electric propulsion system is operable to drive regenerative energy into the bidirectional power converter to charge a battery or turn the electric machine.

Also disclosed is an energy management system for an aircraft. The system includes an electric machine including a first stator surrounding a first rotor having permanent magnets disposed therein. The rotation of the first rotor causes an alternating current to be generated in windings of the first stator that is uncontrolled. The system includes an electric propulsion system including a second stator surrounding a second rotor having permanent magnets disposed therein. The rotation of the second rotor is configured to propel the aircraft. The system includes a battery. The system includes a bidirectional power converter having a first side connected to the electric machine and a second side galvanically isolated from the first side and connected to the electric propulsion system. The bidirectional power converter including a first switching network that regulates power associated with the electric machine and power transfer across the bidirectional power converter operable to satisfy collective power flows from the electric machine, the battery, and the electric propulsion system through the bidirectional power converter.

Also disclosed is a method for managing energy flows of an aircraft. The method includes operating a switching network of a bidirectional power converter to regulate power across the bidirectional power converter such that uncontrolled power generation from primary side having a first electric machine to secondary side having a second electric machine satisfies a power demand by the second electric machine.

In addition to one or more of the features described above, or as an alternative, further embodiments may include that the switching network is operated to satisfy the power demand by adjusting a phase offset of the primary side of the switching network with the secondary side of the switching network.

In addition to one or more of the features described above, or as an alternative, further embodiments may include that the switching network is operated to satisfy a battery power demand associated with the bidirectional power converter.

In addition to one or more of the features described above, or as an alternative, further embodiments may include that switches of the switching network are operated to generate an alternating current that traverses a galvanic isolation of the bidirectional power converter.

In addition to one or more of the features described above, or as an alternative, further embodiments may include that the first electric machine includes permanent magnets that provide uncontrolled power generation.

BRIEF DESCRIPTION OF THE DRAWINGS

The following descriptions should not be considered limiting in any way. With reference to the accompanying drawings, like elements are numbered alike.

DETAILED DESCRIPTION

Aircraft include electric generators to supply power to electrical busses. The electric busses may supply power to operational and auxiliary loads of the aircraft. The electric machines may be driven by gas-powered turbines or other sources. The turbines may also propel the aircraft. To supplement the propulsion, electric machines may be used to drive propulsors, turbines, or other implements. Permanent magnet electric machines may be used to generate electricity from the turbines and drive the propulsors. Without a means to control magnetic fields within the permanent magnet electric machine, the electricity generated therefrom is uncontrolled. A bidirectional power converter may be implemented between the electric machine associated with the turbine and the electric machine associated with the propulsor. The bidirectional power converter provide galvanic isolation between the two electric machines and further provide power generation control when either of the electric machines are in a generating mode. That is, lightweight permanent magnet electric machines may be used to generate electricity for the aircraft without requiring excitation.

A detailed description of one or more embodiments of the disclosed apparatus and method are presented herein by way of exemplification and not limitation with reference to the Figures.

Figure 1:
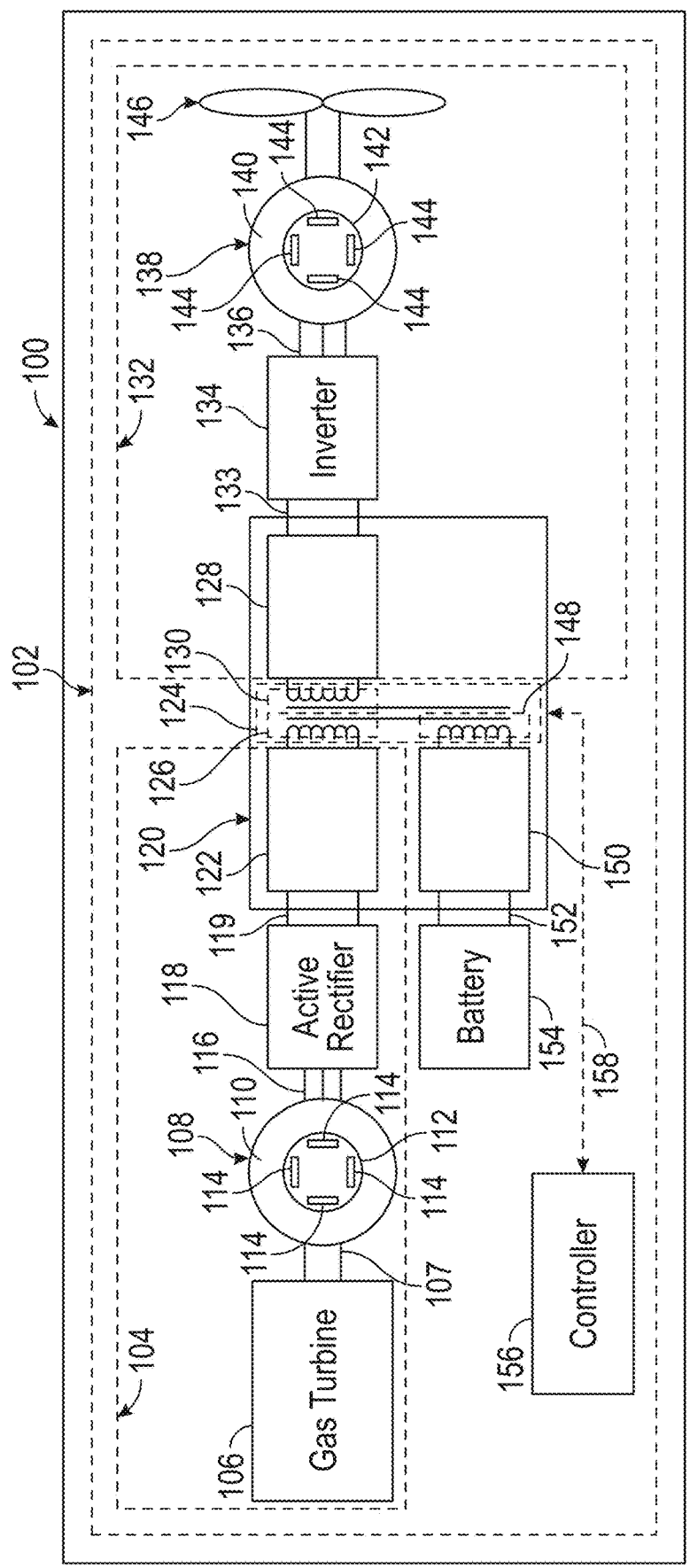
FIG. 1 is a schematic overview of an electric propulsion system of an aircraft.

Referring to FIG. 1 an aircraft 100 is shown. The aircraft 100 includes an energy management system 102. The energy management system 102 includes an energy generation system 104, a bidirectional power converter 120, and an electric propulsion system 132. The energy generation system 104 includes a turbine 106. The turbine 106 generates mechanical energy from fossil fuels. It should be appreciated that any type of mechanical energy generator may be used and any type of fuel source may be employed. Mechanical energy is transferred to the electric machine 108 via shaft 107.

The electric machine 108 includes a stator 110 surrounding a rotor 112. The rotor 112 includes permanent magnets 114. It should be appreciated that the permanent magnets 114 may be arranged in any configuration to create a magnetic field. The rotor 112 (and thus the magnetic field) is rotated by the mechanical energy from the turbine 106 such that an electric current is induced and generated in windings of the stator 110. The induced current may be any number of phases and travel along phase legs 116 to a rectifier 118.

The rectifier 118 may be passive or active. That is, the rectifier 118 may be configured as a diode bridge or other rectifying implement. The rectifier 118 may be full or half wave. The rectifier 118 may also be an active rectifier 118. That is, the active rectifier 118 may include switches operable to rectify alternating currents from the electric machine 108. The switches may be any type of transistor or other implement. Control inputs (such as gates) of the switches may be driven by a controller 156 connected to the active rectifier 118. The active rectifier 118 may be implemented as a rectifier half bridge or combination of switches to produce the desired result, as is known in the art. The rectifier 118 may also include one or more output capacitors to smooth the direct current provided onto a direct current bus 119.

The direct current bus 119 powers a switching network 122, or portion thereof, that regulates power among the bidirectional power converter 120. It should be appreciated that any one of the switching networks 122, 128, 150 may be, collectively or individually, configured to regulate power traversing the bidirectional power converter 120. Switching network 122, or portion thereof, is connect, in part to a first side 126. That is, the switching network 122, or portion thereof, is connected to conductors that are wound to an iron core or galvanic isolation 124. Switching network 128, or a portion thereof, is conductively connected to a second side 130 of the galvanic isolation 124. Further, switching network 150, or a portion thereof, is conductively connected to a third side 148 of galvanic isolation 124. It should be appreciated that the galvanic isolation 124 may include any number of sides and portions and that the galvanic isolation may have a toroidal core without sides. The first side 126 may be considered a primary side, the second side 130 may be considered a secondary side, or vice versa. Each switching network 122, 128, 150 may be wound to respective portions of the iron core of the galvanic isolation such that isolation is achieved. The switching networks 122, 128, 150 may include any type of topology.

The switching networks 122, 128, 150 collectively form the bidirectional power converter 120 in a dual-flyback, dual-Cuk, Zeta-sepic, forward-flyback, dual-push-pull, push-pull-forward, push-pull-flyback, dual-half-bridge, full-bridge-forward, half-full-bridge, dual-active-bridge, H-bridges, or any other configuration. The switching networks 122, 128, 150 may include any type of resonant tank or resonant system to provide soft-switching capabilities. As such, the switching networks 122, 128, 150 are operable to satisfy collective power flows of the electric machine 108 and the electric propulsion system 132 through the bidirectional power converter 120. The switches of each switching network 122, 128, 150 may be any type of transistor or other implement. Gates of the switches may be driven by a controller 156 connected to the switching networks 122, 128, 150.

The switching network 128 associated with the electric propulsion system 132 may draw energy or provide energy to a direct current bus 133. The bidirectional direct current bus 133 provides energy to an inverter 134 of the electric propulsion system 132. The inverter 134 includes switches for converting the direct current from the direct current bus 133 into single phase or multiphase alternating current bus 136 for the propulsion electric machine 138. Similarly, the propulsion electric machine 138 includes a stator 140 that surrounds a rotor 142 having permanent magnets 144 disposed therein. The propulsion electric machine 138 is connected to propulsor 146.

The propulsor 146 may be any type of motive or non-motive device having mechanical or electrical output. That is, the propulsor 146 may be any type of load used by the aircraft 100. It should be appreciated that the propulsor 146 may be operated in a regenerative mode. In the regenerative mode, the propulsor 146 provides mechanical energy to the inverter 134 that is operated in an active rectifier mode, which supplies direct current to the propulsion system direct current bus 133. The direct current bus 133 is connected to the switching network 128 for back-feeding the switching networks 122, 150 connected to the battery 154 and the other electric machine 108. As such, the propulsor 146 can charge the battery 154 or start the turbine 106.

The controller 156 is programmed to, dependent on the operating mode, satisfy all power flows necessary to propel the aircraft 100 through the electric propulsion system 132, regenerate energy through the electric propulsion system 132, charge or discharge the battery 154, start the turbine 106 with energy from the electric propulsion system 132 or battery 154, and charge the battery 154 or provide electric power to the electric propulsion system 132 by running electric machine 108 in a generating mode. Indeed, depending on the mode, the controller 156 can operate each of the switch networks 122, 128, 150 to transfer power across the galvanically isolated bidirectional power converter 120.

Figure 2:
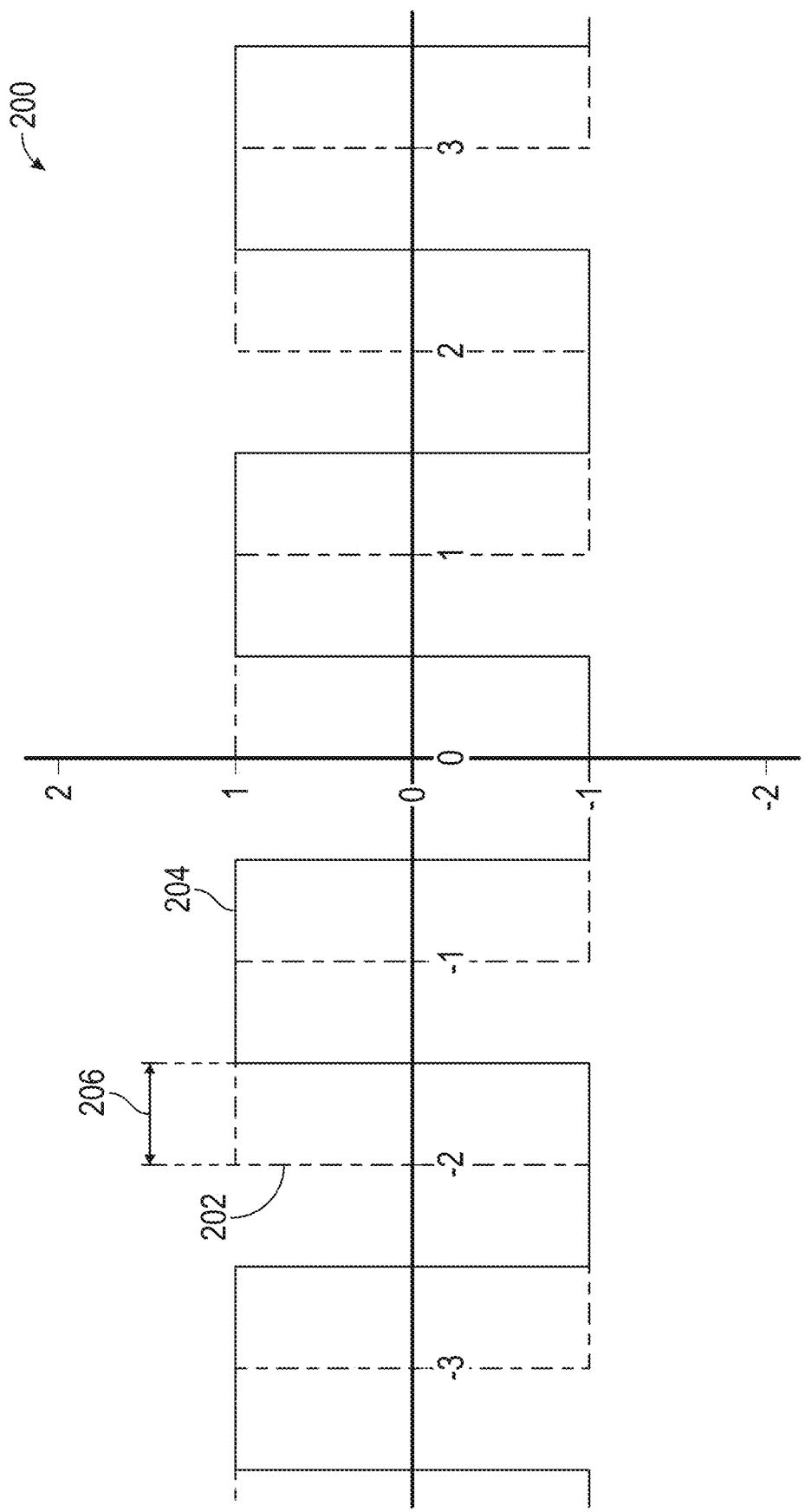
FIG. 2 is a graph of alternating currents having offset phases.

Referring to FIG. 2, a graph 200 of a plurality of signals 202, 204 is shown. The signals 202, 204 have a phase offset 206. The controller 156 may be configured to generate such signals for any one of the switching networks 122, 128, 150. The controller 156 is configured to satisfy collective power flows across the bidirectional power converter 120 by adjusting the phase offset of the switching networks 122, 128. Increasing the phase offset 206 to 45° may increase the amount of power transfer through the bidirectional power converter 120. Decreasing the phase offset 206 to 0° may decrease the amount of power transfer through the bidirectional power converter 120.

Figure 3:
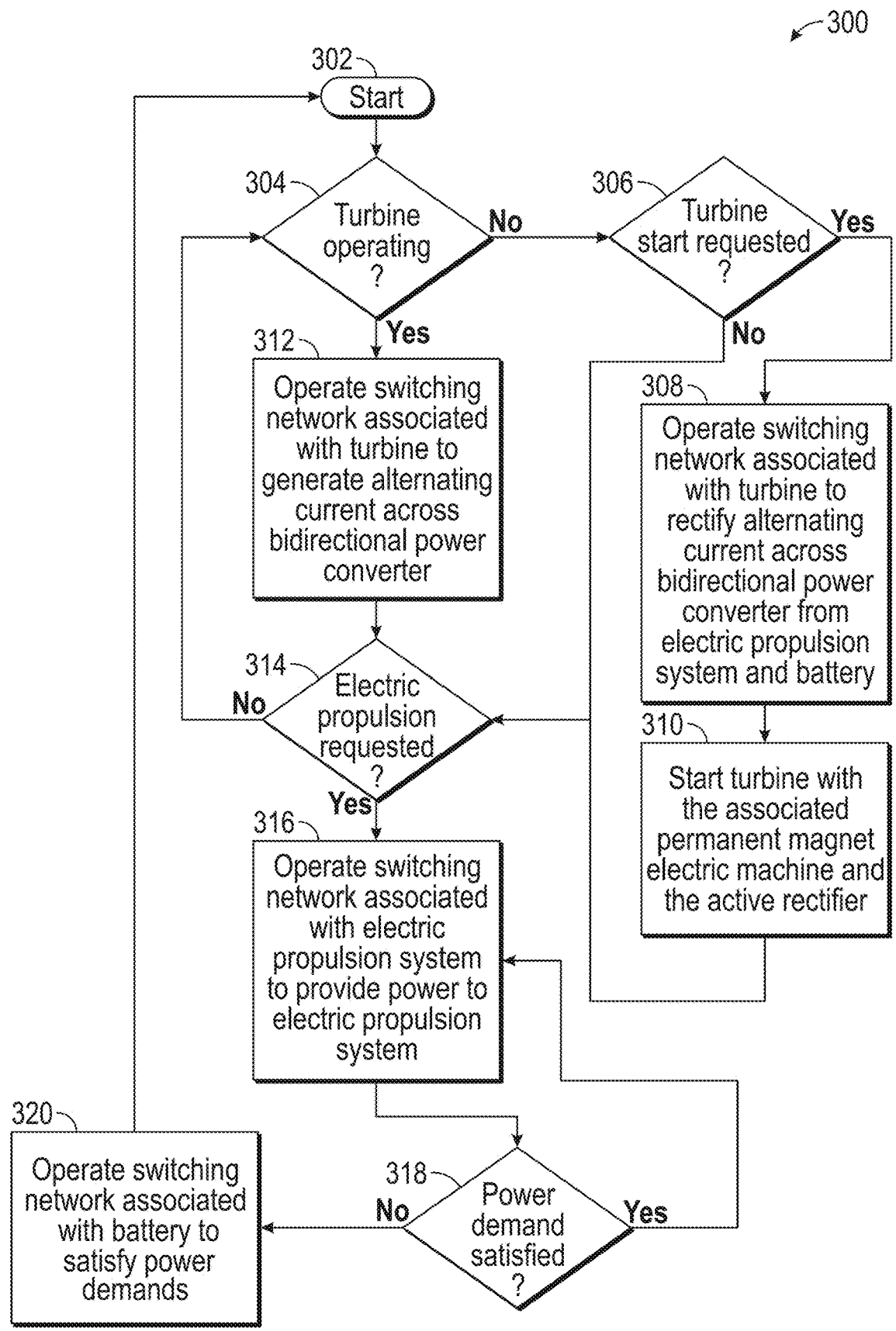
FIG. 3 is a flow diagram including a method for controlling power flows across a bidirectional power converter.

Referring to FIG. 3, a flow chart of a method 300 is shown. The flow chart 300 starts in step 302. In step 304, the controller 156 determines or defines whether the turbine 106 is operating. The controller 156 may have input channels configured to receive positional sensor information (e.g., hall-effect sensor information) to make the determination. If the turbine 106 is not operating, the controller 156 checks inputs and memory to determine whether a turbine 106 start is requested. If a turbine 106 start is requested in step 306, the controller 156 will operate the switching network 122 to back-feed the electric machine 108 and turn the turbine 106. Power to accomplish this task may be provided to the bidirectional power converter 120 by the electric propulsion system 132 in a regenerative mode or by energy stored in battery 154. The respective switching networks 122, 128, 150 are operated according to FIG. 2 having an offset phase that ensures necessary power flows are satisfied (e.g., enough torque is generated in electric machine 108 to turn the turbine). In step 310, the turbine 106 is started by the associated electric machine 108.

If the turbine 106 is operating in step 304, the electric machine 108 is driven by the turbine 106 unless a disconnect clutch or gearset is operated. As such, the switching network 122 may be operated to generate alternating current across the bidirectional power converter 120 in step 312. If electric propulsion is requested in step 314, the controller 156 may operate the switching network 128 to transfer energy across the bidirectional power converter 120 in step 316. That is, the electric propulsion system 132 is configured to draw energy from the bidirectional power converter 120 to drive the propulsor 146. If the power demand is satisfied in step 318, the process repeats. If the power demand is not satisfied, the controller 156 may operate the switching network 150 associated with the battery 154. It should be appreciated that power flows in any direction may be satisfied by the bidirectional power converter 120 by operation of the switching networks 122, 128, 150 and respective phase shifts generated therein to properly transfer power to, from, and among the turbine 106, propulsor 146, and battery 154.

The controller may include any combination of processors, field programmable gate arrays (FPGA), or application specific integrated circuits (ASIC). The controller may include memory, volatile and non-volatile, operable to store machine instructions from the processors and other processing mechanisms to receive, calculate, and control devices, as necessary. Machine instructions may be stored in any language or representation, including but not limited to machine code, assembly instructions, C, C++, C #, PASCAL, COBAL, PYTHON, JAVA, and RUBY. It should be appreciated that any type of wired or wireless configuration is appreciated for any of the communications from the controller. Wireless protocols such as ZIGBEE, WI-FI, or any other implement may be used. Communications may be realized through any protocol or medium known or unknown.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An energy management system for an aircraft, the system comprising:
   an electric machine including a stator surrounding a rotor having permanent magnets disposed therein, wherein rotation of the rotor causes an alternating current to be generated in windings of the stator that is uncontrolled;
   an electric propulsion system; and
   a bidirectional power converter having a first side connected to the electric machine and a second side galvanically isolated from the first side and connected to the electric propulsion system, the bidirectional power converter including a collective switching network that regulates power associated with the electric machine and power transfer across the bidirectional power converter, the collective switching network operable to satisfy collective power flows of the electric machine and the electric propulsion system through the bidirectional power converter, wherein the collective switching network including a first individual switching network configured to operate according to a first phase, a second individual switching network configured to operate independently from the first individual switching network according to a second phase, and a third individual switching network configured to operate independently from the first and second individual switching networks according to a third phase.

2. The energy management system of claim 1 further comprising, a controller operable to operate the collective switching network to regulate power associated with the electric machine and power transfer across the bidirectional power converter.

3. The energy management system of claim 1 further comprising, a battery connected to the bidirectional power converter via direct connection to the third individual switching network located at a third side of the bidirectional power converter, without directly connecting the first and second individual switching networks.

4. The energy management system of claim 3, wherein the collective switching network is further operable to regulate power transfer across the bidirectional power converter operable to satisfy collective power flows from the electric machine, the battery and the electric propulsion system through the bidirectional power converter.

5. The energy management system of claim 1, wherein the collective switching network includes H-bridges operable to transfer alternating current across the bidirectional power converter.

6. The energy management system of claim 5 further comprising, a controller operable to drive gates of switches of a first of the H-bridges that produces an offset phase from a phase of a second of the H-bridges.

7. The energy management system of claim 1 further comprising, a rectifier disposed to conduct current between the electric machine and the bidirectional power converter, the rectifier including an input connected directly to the electric machine and an output connected directly to the first individual switching network, without directly being directly connected to the second and third individual switching networks.

8. The energy management system of claim 7, wherein the rectifier is an active rectifier having switches operable to rectify alternating current from the electric machine and alternate direct current from the bidirectional power converter operable to turn the electric machine.

9. The energy management system of claim 8, wherein the electric machine is operable to start a turbine.

10. The energy management system of claim 8, wherein the active rectifier includes a rectifier half bridge.

11. The energy management system of claim 8, wherein the electric propulsion system includes an inverter, a propulsion electric machine, and a propulsor, the inverter including an input directly connected to the second individual switching network and an output directly connected to the propulsion electric machine, without directly being directly connected to the first and third individual switching networks.

12. The energy management system of claim 11, wherein the electric propulsion system is operable to draw energy from the bidirectional power converter to propel the aircraft.

13. The energy management system of claim 11, wherein the electric propulsion system is operable to drive regenerative energy into the bidirectional power converter to charge a battery or turn the electric machine.

14. An energy management system for an aircraft, the system comprising:
an electric machine including a first stator surrounding a first rotor having permanent magnets disposed therein, wherein rotation of the first rotor causes an alternating current to be generated in windings of the first stator that is uncontrolled;
an electric propulsion system including a second stator surrounding a second rotor having permanent magnets disposed therein, wherein rotation of the second rotor is configured to propel the aircraft;
a battery; and
a bidirectional power converter having a first side connected to the electric machine and a second side galvanically isolated from the first side and connected to the electric propulsion system, the bidirectional power converter including a collective switching network that regulates power associated with the electric machine and power transfer across the bidirectional power converter operable to satisfy collective power flows from the electric machine, the battery, and the electric propulsion system through the bidirectional power converter,
wherein the collective switching network including a first individual switching network configured to operate according to a first phase, a second individual switching network configured to operate independently from the first individual switching network according to a second phase, and a third individual switching network configured to operate independently from the first and second individual switching networks according to a third phase.

15. A method for managing energy flows of an aircraft, the method comprising:
operating a collective switching network of a bidirectional power converter configured to effect a galvanic isolation between a first electric machine located at a primary side and a second electric machine located at a secondary side, and to regulate power across the bidirectional power converter such that uncontrolled power generation from the primary side to the secondary side satisfies a power demand by the second electric machine,
wherein the collective switching network including a first individual switching network configured to operate according to a first phase, a second individual switching network configured to operate independently from the first individual switching network according to a second phase, and a third individual switching network configured to operate independently from the first and second individual switching networks according to a third phase.

16. The method of claim 15, wherein the collective switching network is operated to satisfy the power demand by adjusting a phase offset of the primary side of the collective switching network with the secondary side of the collective switching network.

17. The method of claim 15, wherein the collective switching network is operated to satisfy a battery power demand associated with the bidirectional power converter.

18. The method of claim 15, wherein switches of the collective switching network are operated to generate an alternating current that traverses the galvanic isolation of the bidirectional power converter.

19. The method of claim 15, wherein the first electric machine includes permanent magnets that provide uncontrolled power generation.

\* \* \* \* \*